United States Patent
Kubo et al.

(10) Patent No.: US 12,404,182 B2
(45) Date of Patent: Sep. 2, 2025

(54) METHOD FOR PRODUCING HALIDE

(71) Applicant: Panasonic Intellectual Property Management Co., Ltd., Osaka (JP)

(72) Inventors: Takashi Kubo, Hyogo (JP); Kazufumi Miyatake, Osaka (JP); Keita Mizuno, Aichi (JP); Tetsuya Asano, Nara (JP); Akihiro Sakai, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 599 days.

(21) Appl. No.: 17/933,098

(22) Filed: Sep. 17, 2022

(65) Prior Publication Data

US 2023/0015865 A1    Jan. 19, 2023

Related U.S. Application Data

(63) Continuation of application No. PCT/JP2021/003305, filed on Jan. 29, 2021.

(30) Foreign Application Priority Data

Mar. 31, 2020    (JP) ................. 2020-064815

(51) Int. Cl.
    *C01F 17/253*     (2020.01)
(52) U.S. Cl.
    CPC ................. *C01F 17/253* (2020.01)
(58) Field of Classification Search
    CPC ................. C01F 17/253
    USPC ................. 423/21.1
    See application file for complete search history.

(56) References Cited

U.S. PATENT DOCUMENTS

| | | |
|---|---|---|
| 2019/0088995 A1 | 3/2019 | Asano et al. |
| 2020/0212481 A1 | 7/2020 | Nagamine et al. |
| 2020/0328461 A1 | 10/2020 | Asano et al. |

FOREIGN PATENT DOCUMENTS

| | | |
|---|---|---|
| WO | 2018/025582 | 2/2018 |
| WO | 2019/135328 | 7/2019 |
| WO | 2019/135344 | 7/2019 |

OTHER PUBLICATIONS

Machine translation of WO 2019135328 A1. (Year: 2019).*
International Search Report of PCT application No. PCT/JP2021/003305 dated Mar. 30, 2021.

* cited by examiner

*Primary Examiner* — Coris Fung
*Assistant Examiner* — Catriona M Corallo
(74) *Attorney, Agent, or Firm* — GREENBLUM & BERNSTEIN, P.L.C.

(57) ABSTRACT

A production method for producing a halide, the method includes a heat treatment step of heat-treating a mixed material containing $(NH_4)_a Y\alpha_{3+a}$, $(NH_4)_b Sm\beta_{3+b}$, $Li\gamma$, and $Ca\delta_2$ in an inert gas atmosphere, wherein $\alpha$, $\beta$, $\gamma$, and $\delta$ are each independently at least one selected from the group consisting of F, Cl, Br, and I, and the following three formulas: $0 \le a \le 3$, $0 \le b \le 3$, and $0 < a+b \le 6$, are satisfied.

10 Claims, 3 Drawing Sheets

METHOD FOR PRODUCING HALIDE

BACKGROUND

1. Technical Field

The present disclosure relates to a production method for producing a halide.

2. Description of the Related Art

International Publication No. 2018/025582 discloses a production method for producing a halide solid electrolyte.

SUMMARY

One non-limiting and exemplary embodiment provides a production method for producing a halide with industrially high productivity.

In one general aspect, the techniques disclosed here feature a production method for producing a halide, the method containing heat-treating a mixed material containing $(NH_4)_aY\alpha_{3+a}$, $(NH_4)_bSm\beta_{3+b}$, $Li\gamma$, and $Ca\delta_2$ in an inert gas atmosphere, wherein $\alpha$, $\beta$, $\gamma$, and $\delta$ are each independently at least one selected from the group consisting of F, Cl, Br, and I, and the following three formulas: $0 \leq a \leq 3$, $0 \leq b \leq 3$, and $0 < a+b \leq 6$, are satisfied.

The present disclosure provides a production method for producing a halide with industrially high productivity.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTIONS

Embodiments will be described below with reference to the drawings.

First Embodiment

Figure 1:
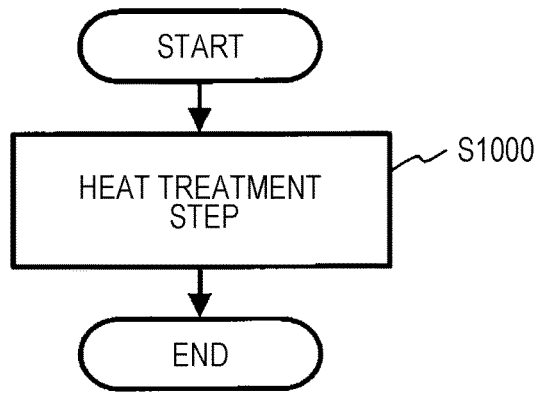
FIG. 1 is a flowchart showing an example of a production method according to a first embodiment.

FIG. 1 is a flowchart showing an example of a production method according to a first embodiment.

The production method according to the first embodiment includes a heat treatment step S1000. In the heat treatment step S1000, a mixed material is heat-treated in an inert gas atmosphere.

The mixed material to be heat-treated in the heat treatment step S1000 includes $(NH_4)_aY\alpha_{3+a}$, $(NH_4)_bSm\beta_{3+b}$, $Li\gamma$, and $Ca\delta_2$, wherein $\alpha$, $\beta$, $\gamma$, and $\delta$ are each independently at least one selected from the group consisting of F, Cl, Br, and I. Furthermore, the formulas: $0 \leq a \leq 3$, $0 \leq b \leq 3$, and $0 < a+b \leq 6$ are satisfied.

The production method according to the first embodiment is a method for producing a halide with industrially high productivity. The method with industrially high productivity is, for example, a method enabling low-cost mass production. That is, by a simple and easy production method (i.e., heat treatment in an inert gas atmosphere), a halide containing Li (i.e., lithium), Y (i.e., yttrium), Sm (i.e., samarium), and Ca (i.e., calcium) can be produced.

In the production method according to the first embodiment, it is not necessary to use a vacuum-sealed tube and a planetary ball mill.

Since "$(NH_4)_aY\alpha_{3+a}$" included in the mixed material can be simply and easily synthesized from inexpensive $Y_2O_3$ and $NH_4\alpha$, the production cost can be further reduced.

Since "$(NH_4)_bSm\beta_{3+b}$" included in the mixed material can be simply and easily synthesized from inexpensive $Sm_2O_3$ and $NH_4\beta$, the production cost can be further reduced.

In order to enhance the ionic conductivity of a halide, the formulas: $0.5 \leq a \leq 3$, and $0.5 \leq b \leq 3$ may be satisfied.

In order to enhance the ionic conductivity of a halide, the formulas: $a=3$, and $b=3$ may be satisfied.

In order to further enhance the ionic conductivity of a halide, $\alpha$, $\beta$, $\gamma$, and $\delta$ may be each independently at least one selected from the group consisting of Cl and Br.

For example, in the case where the mixed material to be heat-treated in the heat treatment step S1000 includes $(NH_4)_3YCl_6$, $(NH_4)_3SmCl_6$, LiCl, and $CaCl_2$, the reaction represented by the formula (1) below is considered to proceed.

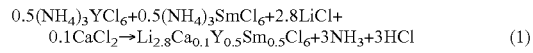

$$0.5(NH_4)_3YCl_6 + 0.5(NH_4)_3SmCl_6 + 2.8LiCl + 0.1CaCl_2 \rightarrow Li_{2.8}Ca_{0.1}Y_{0.5}Sm_{0.5}Cl_6 + 3NH_3 + 3HCl \quad (1)$$

By the reaction represented by the formula (1), $Li_{2.8}Ca_{0.1}Y_{0.5}Sm_{0.5}Cl_6$ is obtained.

In the heat treatment step S1000, for example, powder of the mixed material may be placed in a container (e.g., a crucible) and heat-treated in a heating furnace. In this case, the state in which the mixed material is heated to a predetermined temperature in an inert gas atmosphere may be held for more than or equal to a predetermined time. The heat treatment time may be a time period that does not cause a compositional change of a heat-treated product due to volatilization of a halide or the like. The term "not causing a compositional change of a heat-treated product" means not impairing the ionic conductivity of the heat-treated product. In the production method according to the first embodiment, for example, it is possible to produce a halide having an ionic conductivity of greater than or equal to $3.1 \times 10^{-10}$ S/cm at around room temperature.

The inert gas atmosphere means, for example, an atmosphere in which the total concentration of gases other than the inert gas is less than or equal to 1% by volume. The inert gas is, for example, helium, nitrogen, or argon.

After the heat treatment step S1000, the heat-treated product may be pulverized. In this case, a pulverizing apparatus (e.g., a mortar or mixer) may be used.

The mixed material may be a material in which $(NH_4)_aY\alpha_{3+a}$, $(NH_4)_bSm\beta_{3+b}$, $Li\gamma$, and $Ca\delta_2$ are mixed. That is, the mixed material may consist of $(NH_4)_aY\alpha_{3+a}$, $(NH_4)_bSm\beta_{3+b}$, $Li\gamma$, and $Ca\delta_2$.

The mixed material may further include, in addition to $(NH_4)_aY\alpha_{3+a}$, $(NH_4)_bSm\beta_{3+b}$, $Li\gamma$, and $Ca\delta_2$, a material different from $(NH_4)_aY\alpha_{3+a}$, $(NH_4)_bSm\beta_{3+b}$, $Li\gamma$, and $Ca\delta_2$.

In at least one selected from the group consisting of $(NH_4)_aY\alpha_{3+a}$ and $(NH_4)_bSm\beta_{3+b}$ included in the mixed material, part of metal cations may be replaced with other metal cations. That is, part of Y and Sm may be replaced with other metal cations. Accordingly, the mixed material may further include a compound in which part of Y in $(NH_4)_aY\alpha_{3+a}$ is replaced with other metal cations, or a compound in which part of Sm in $(NH_4)_bSm\beta_{3+b}$ is replaced with other metal cations. Thus, it is possible to improve the properties (e.g., ionic conductivity) of the resulting halide. The cation substitution ratio of Y and Sm with other metal cations may be less than 50 mol %. Thus, a halide with a stabler structure can be obtained.

In at least one selected from the group consisting of $Li\gamma$ and $Ca\delta_2$ included in the mixed material, part of metal cations may be replaced with other metal cations. That is, part of Li and Ca may be replaced with other metal cations. Accordingly, the mixed material may further include a compound in which part of Li in $Li\gamma$ is replated with other metal cations, or a compound in which part of Ca in $Ca\delta_2$ is replaced with other metal cations. Thus, it is possible to improve the properties (e.g., ionic conductivity) of the resulting halide. The cation substitution ratio of Li and Ca with other metal cations may be less than 50 mol %. Thus, a halide with a stabler structure can be obtained.

In at least one selected from the group consisting of $(NH_4)_aY\alpha_{3+a}$ and $(NH_4)_bSm\beta_{3+b}$ included in the mixed material, part of metal cations may be, for example, replaced with at least one cation selected from the group consisting of Na, K, Mg, Sr, Ba, Zn, In, Sn, Bi, La, Ce, Pr, Nd, Pm, Sm, Eu, Tb, Dy, Ho, Er, Tm, Yb, and Lu.

In the heat treatment step S1000, the mixed material may be heat-treated at higher than or equal to 300° C. Thus, a halide having high ionic conductivity can be produced by a method with industrially high productivity. By setting the heat treatment temperature to be higher than or equal to 300° C., the mixed material can be reacted sufficiently. That is, $(NH_4)_aY\alpha_{3+a}$, $(NH_4)_bSm\beta_{3+b}$, $Li\gamma$, and $Ca\delta_2$ can be reacted sufficiently. Here, the term "heat treatment temperature" refers to ambient temperature. In the case where the mixed material is heat-treated at higher than or equal to 300° C., it is possible to produce a halide having an ionic conductivity of greater than or equal to $6.7 \times 10^{-7}$ S/cm at around room temperature.

In the heat treatment step S1000, the mixed material may be heat-treated at lower than or equal to 650° C. The mixed material may be heat-treated, for example, at higher than or equal to 300° C. and lower than or equal to 650° C. Thus, a halide having high ionic conductivity can be produced by a method with industrially high productivity. By setting the heat treatment temperature to be lower than or equal to 650° C., it is possible to suppress thermal decomposition of a halide formed by a solid phase reaction. Consequently, the ionic conductivity of a halide, which is a heat-treated product, can be enhanced. That is, a high-quality halide solid electrolyte can be obtained.

In order to produce a halide having higher ionic conductivity by a method with industrially high productivity, the mixed material may be heat-treated at higher than or equal to 350° C. The mixed material may be heat-treated, for example, at higher than or equal to 350° C. and lower than or equal to 650° C. By setting the heat treatment temperature to be higher than or equal to 350° C., a halide, which is a heat-treated product, has higher crystallinity. Consequently, the ionic conductivity of a halide, which is a heat-treated product, can be further enhanced. That is, a higher-quality halide solid electrolyte material can be obtained.

In order to produce a halide having higher ionic conductivity by a method with industrially high productivity, the mixed material may be heat-treated at higher than or equal to 450° C. The mixed material may be heat-treated, for example, at higher than or equal to 450° C. and lower than or equal to 650° C. By setting the heat treatment temperature to be higher than or equal to 450° C., a halide, which is a heat-treated product, has higher crystallinity. Consequently, the ionic conductivity of a halide, which is a heat-treated product, can be further enhanced. That is, a higher-quality halide solid electrolyte material can be obtained.

In order to produce a halide having higher ionic conductivity by a method with industrially high productivity, the mixed material may be heat-treated for more than or equal to 1 hour and less than or equal to 72 hours. By setting the heat treatment time to be more than or equal to 1 hour, the mixed material can be reacted sufficiently. That is, $(NH_4)_aY\alpha_{3+a}$, $(NH_4)_bSm\beta_{3+b}$, $Li\gamma$, and $Ca\delta_2$ can be reacted sufficiently. By setting the heat treatment time to be less than or equal to 72 hours, volatilization of a halide, which is a heat-treated product, can be suppressed. That is, it is possible to obtain a halide having a target compositional ratio. Consequently, it is possible to suppress a decrease in ionic conductivity of a halide due to a compositional change. That is, a higher-quality halide solid electrolyte material can be obtained.

Figure 2:
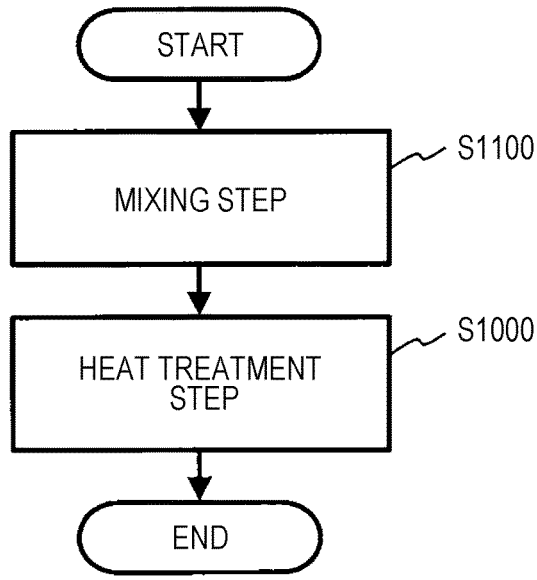
FIG. 2 is a flowchart showing an example of a production method according to the first embodiment.

FIG. 2 is a flowchart showing an example of a production method according to the first embodiment.

As shown in FIG. 2, the production method according to the first embodiment may further include a mixing step S1100.

The mixing step S1100 is carried out before the heat treatment step S1000.

In the mixing step S1100, $(NH_4)_aY\alpha_{3+a}$, $(NH_4)_bSm\beta_{3+b}$, $Li\gamma$, and $Ca\delta_2$ serving as starting materials are mixed. Thus, a mixed material is obtained. That is, a material to be heat-treated in the heat treatment step S1000 is obtained.

In order to mix the starting materials, a commonly known mixing apparatus (e.g., a mortar, blender, or ball mill) may be used.

For example, in the mixing step S1100, powders of the starting materials may be prepared and mixed. In this case, in the heat treatment step S1000, a mixed material in the form of powder may be heat-treated. The mixed material in the form of powder obtained in the mixing step S1100 may be shaped into pellets by pressing. Alternatively, in the heat treatment step S1000, a mixed material in the form of pellets may be heat-treated.

In the mixing step S1100, by further mixing, in addition to $(NH_4)_aY\alpha_{3+a}$, $(NH_4)_bSm\beta_{3+b}$, $Li\gamma$, and $Ca\delta_2$, a starting material different from $(NH_4)_aY\alpha_{3+a}$, $(NH_4)_bSm\beta_{3+b}$, $Li\gamma$, and $Ca\delta_2$, a mixed material may be obtained.

In the mixing step S1100, a starting material containing $(NH_4)_aY\alpha_{3+a}$ as a main component, a starting material containing $(NH_4)_bSm\beta_{3+b}$ as a main component, a starting material containing $Li\gamma$ as a main component, and a starting material containing $Ca\delta_2$ as a main component may be mixed. The term "main component" refers to a component having the highest content by molar ratio.

In the mixing step S1100, $(NH_4)_aY\alpha_{3+a}$, $(NH_4)_bSm\beta_{3+b}$, $Li\gamma$, and $Ca\delta_2$ may be prepared and mixed so as to have a target composition.

For example, $(NH_4)_3YCl_6$, $(NH_4)_3SmCl_6$, LiCl, and $CaCl_2$ may be mixed so as to satisfy the molar ratio of $(NH_4)_3YCl_6:(NH_4)_3SmCl_6:LiCl:CaCl_2=0.5:0.5:2.8:0.1$. Thus, a halide having the composition represented by $Li_{2.8}Ca_{0.1}Y_{0.5}Sm_{0.5}Cl_6$ can be produced.

The molar ratio of $(NH_4)_aY\alpha_{3+a}$, $(NH_4)_bSm\beta_{3+b}$, $Li\gamma$, and $Ca\delta_2$ may be adjusted beforehand so as to cancel out a compositional change that may occur in the heat treatment step S1000.

In the mixing step S1100, in at least one selected from the group consisting of $(NH_4)_aY\alpha_{3+a}$ and $(NH_4)_bSm\beta_{3+b}$, part of metal cations may be replaced with other metal cations. That is, part of Y and Sm may be replaced with other metal cations. A mixed material may be obtained by further mixing a compound in which part of Y in $(NH_4)_aY\alpha_{3+a}$ is replaced with other metal cations, or a compound in which part of Sm in $(NH_4)_bSm\beta_{3+b}$ is replaced with other metal cations. The cation substitution ratio of Y and Sm with other metal cations may be less than 50 mol %.

In the mixing step S1100, in at least one selected from the group consisting of $Li\gamma$ and $Ca\delta_2$, part of metal cations may be replaced with other metal cations. That is, part of Li and Ca may be replaced with other metal cations. A mixed material may be obtained by further mixing a compound in which part of Li in $Li\gamma$ is replated with other metal cations, or a compound in which part of Ca in $Ca\delta_2$ is replaced with other metal cations. The cation substitution ratio of Li and Ca with other metal cations may be less than 50 mol %.

Figure 3:
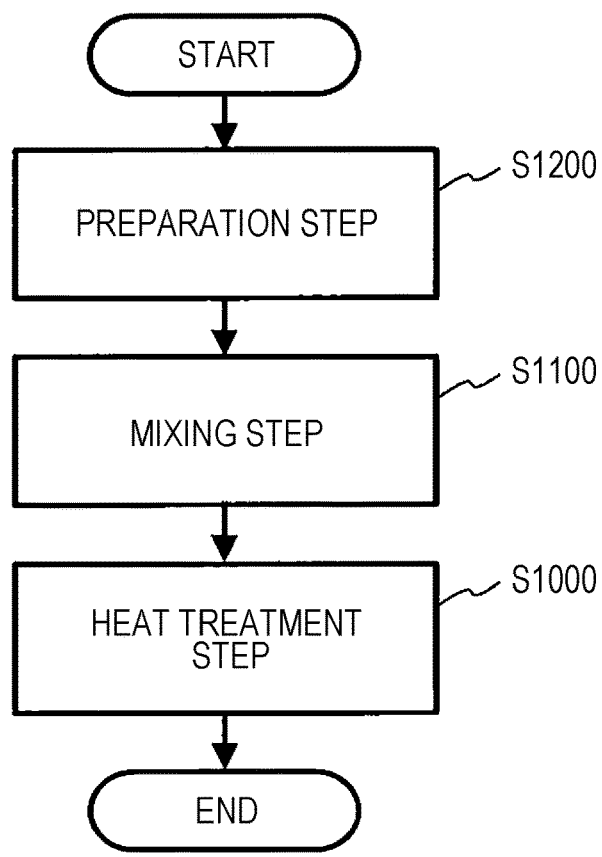
FIG. 3 is a flowchart showing an example of a production method according to the first embodiment.

FIG. 3 is a flowchart showing an example of a production method according to the first embodiment.

As shown in FIG. 3, the production method according to the first embodiment may further include a preparation step S1200.

The preparation step S1200 is carried out before the mixing step S1100.

In the preparation step S1200, $(NH_4)_aY\alpha_{3+a}$ and $(NH_4)_bSm\beta_{3+b}$ are prepared. In the preparation step S1200, $Li\gamma$ and $Ca\delta_2$ may be further prepared. That is, materials to be mixed in the mixing step S1100 may be prepared.

In the preparation step S1200, a starting material, such as $(NH_4)_aY\alpha_{3+a}$, $(NH_4)_bSm\beta_{3+b}$, $Li\gamma$, or $Ca\delta_2$, may be synthesized. Alternatively, in the preparation step S1200, commonly known, commercially available products (e.g., materials with a purity of greater than or equal to 99%) may be used.

Materials to be prepared may be dry.

Materials to be prepared may be, for example, in the form of crystals, aggregates, flakes, or powder. In the preparation step S1200, starting materials in the form of powder may be obtained by pulverizing starting materials in the form of crystals, aggregates, or flakes.

In order to reduce production cost, in the preparation step S1200, $(NH_4)_aY\alpha_{3+a}$ may be synthesized from inexpensive $Y_2O_3$ and $NH_4\alpha$.

In order to reduce production cost, in the preparation step S1200, $(NH_4)_bSm\beta_{3+b}$ may be synthesized from inexpensive $Sm_2O_3$ and $NH_4\beta$.

$(NH_4)_aY\alpha_{3+a}$ is, for example, synthesized as follows.

$Y_2O_3$ and $NH_4\alpha$, as starting materials, are mixed, for example, at a molar ratio of $Y_2O_3:NH_4\alpha=1:12$ to obtain a mixture. The mixture is heat-treated, for example, at higher than or equal to 150° C. and lower than or equal to 350° C. The value of a can vary depending on the heat treatment temperature.

For example, in the case where α is Cl, i.e., in the case where $Y_2O_3$ and $NH_4Cl$ are mixed and heat-treated, the reactions represented by the formulas (2) and (3) below are considered to proceed.

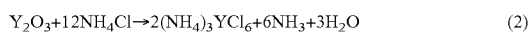

$$Y_2O_3+12NH_4Cl \rightarrow 2(NH_4)_3YCl_6+6NH_3+3H_2O \quad (2)$$

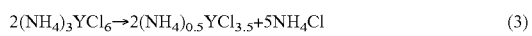

$$2(NH_4)_3YCl_6 \rightarrow 2(NH_4)_{0.5}YCl_{3.5}+5NH_4Cl \quad (3)$$

When the mixture containing $Y_2O_3$ and $NH_4Cl$ is heat-treated, for example, at about 200° C., the reaction represented by the formula (2) takes place. As a result, $(NH_4)_3YCl_6$ is obtained as a main product. When the mixture is heat-treated, for example, at about 350° C., the reaction represented by the formula (3) takes place. As a result, $(NH_4)_{0.5}YCl_{3.5}$ is obtained as a main product. In this way, when the heat treatment temperature changes, the value of a can also change.

Note that, in order to make the reaction proceed satisfactorily, $NH_4\alpha$ may be prepared in an excessive amount with respect to $Y_2O_3$. For example, the amount of $NH_4\alpha$ prepared is 5 to 15 mol % in excess with respect to $Y_2O_3$.

The heat treatment may be performed in an inert gas (e.g., helium, nitrogen, or argon) atmosphere or in a reduced pressure atmosphere.

$(NH_4)_bSm\beta_{3+b}$ is, for example, synthesized as follows.

$Sm_2O_3$ and $NH_4\beta$, as starting materials, are mixed, for example, at a molar ratio of $Sm_2O_3:NH_4\beta=1:12$ to obtain a mixture. The mixture is heat-treated, for example, at higher than or equal to 150° C. and lower than or equal to 350° C. The value of b can vary depending on the heat treatment temperature.

For example, in the case where β is Cl, i.e., in the case where $Sm_2O_3$ and $NH_4Cl$ are mixed and heat-treated, the reactions represented by the formulas (4) and (5) below are considered to proceed.

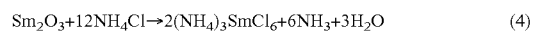

$$Sm_2O_3+12NH_4Cl \rightarrow 2(NH_4)_3SmCl_6+6NH_3+3H_2O \quad (4)$$

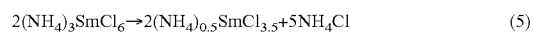

$$2(NH_4)_3SmCl_6 \rightarrow 2(NH_4)_{0.5}SmCl_{3.5}+5NH_4Cl \quad (5)$$

When the mixture containing $Sm_2O_3$ and $NH_4Cl$ is heat-treated, for example, at about 200° C., the reaction represented by the formula (4) takes place. As a result, $(NH_4)_3SmCl_6$ is obtained as a main product. When the mixture is heat-treated, for example, at about 350° C., the reaction represented by the formula (5) takes place. As a result, $(NH_4)_{0.5}SmCl_{3.5}$ is obtained as a main product. In this way, when the heat treatment temperature changes, the value of b can also change.

In order to make the reaction proceed satisfactorily, $NH_4Cl$ may be prepared in an excessive amount with respect to $Sm_2O_3$. For example, the amount of $NH_4\beta$ prepared is 5 to 15 mol % in excess with respect to $Sm_2O_3$.

The heat treatment may be performed in an inert gas (e.g., helium, nitrogen, or argon) atmosphere or in a reduced pressure atmosphere.

In at least one selected from the group consisting of $(NH_4)_aY\alpha_{3+a}$ and $(NH_4)_bSm\beta_{3+b}$, which are prepared in the preparation step S1200, part of metal cations may be replaced with other metal cations. That is, part of Y and Sm may be replaced with other metal cations. That is, a compound in which part of Y in $(NH_4)_aY\alpha_{3+a}$ is replaced with other metal cations, or a compound in which part of Sm in $(NH_4)_bSm\beta_{3+b}$ is replaced with other metal cations may be further prepared. The cation substitution ratio of Y and Sm with other metal cations may be less than 50 mol %.

The halide produced by the production method of the present disclosure can be used as a solid electrolyte material. The solid electrolyte material may be, for example, a solid electrolyte having lithium ion conductivity. The solid electrolyte material is used, for example, in all-solid-state lithium-ion secondary batteries.

EXAMPLES

The present disclosure will be described in more detail below.

Halides produced by the production method of the present disclosure described below were evaluated as solid electrolyte materials.

<Sample 1>
(Production of Solid Electrolyte Material)

First, $(NH_4)_3YCl_6$ and $(NH_4)_3SmCl_6$ serving as starting materials for a solid electrolyte material were synthesized.

As starting materials for $(NH_4)_3YCl_6$, $Y_2O_3$ and $NH_4Cl$ were prepared so as to satisfy the molar ratio of $Y_2O_3$:$NH_4Cl=1:13.2$. That is, the preparation was made so that the amount of $NH_4Cl$ was 10 mol % in excess with respect to $Y_2O_3$. These materials were pulverized in a mortar made of agate and mixed. The resulting mixture was placed in a crucible made of alumina, and heat-treated, in a nitrogen atmosphere, at 200° C. for 15 hours. Thus, $(NH_4)_3YCl_6$ was obtained.

As starting materials for $(NH_4)_3SmCl_6$, $Sm_2O_3$ and $NH_4Cl$ were prepared so as to satisfy the molar ratio of $Sm_2O_3$:$NH_4Cl=1:13.2$. That is, the preparation was made so that the amount of $NH_4Cl$ was 10 mol % in excess with respect to $Sm_2O_3$. These materials were pulverized in a mortar made of agate and mixed. The resulting mixture was placed in a crucible made of alumina, and heat-treated, in a nitrogen atmosphere, at 150° C. for 15 hours. Thus, $(NH_4)_3SmCl_6$ was obtained.

Next, in an argon atmosphere with a dew point of lower than or equal to −60° C. and an oxygen concentration of less than or equal to 0.0001% by volume (hereinafter, referred to as "a dry argon atmosphere"), $(NH_4)_3YCl_6$, $(NH_4)_3SmCl_6$, LiCl, LiBr, and $CaBr_2$ were prepared so as to satisfy the molar ratio of $(NH_4)_3YCl_6$:$(NH_4)_3SmCl_6$:LiCl:LiBr:$CaBr_2$=0.8:0.2:0.5:2.3:0.1. These materials were pulverized and mixed with a mortar made of agate. The resulting mixture was placed in a crucible made of alumina, and heat-treated, in a dry argon atmosphere, at 500° C. for 1 hour. The resulting heat-treated product was pulverized in a mortar made of agate. Thus, a solid electrolyte material according to Sample 1 containing Li, Ca, Y, Sm, Br, and Cl was obtained.

(Composition Analysis of Solid Electrolyte Material)

The contents per unit weight of Li, Ca, Y, and Sm in the entire solid electrolyte material according to Sample 1 were measured by an inductively coupled plasma atomic emission spectrochemical analysis method using an inductively coupled plasma atomic emission spectrochemical analysis device (Thermo Fisher Scientific K.K., iCAP7400). On the basis of the contents of Li, Ca, Y, and Sm measured, a molar ratio of Li:Ca:Y:Sm was calculated. As a result, the molar ratio of Li:Ca:Y:Sm was 2.8:0.1:0.8:0.2.

(Evaluation of Ionic Conductivity)

Figure 4:
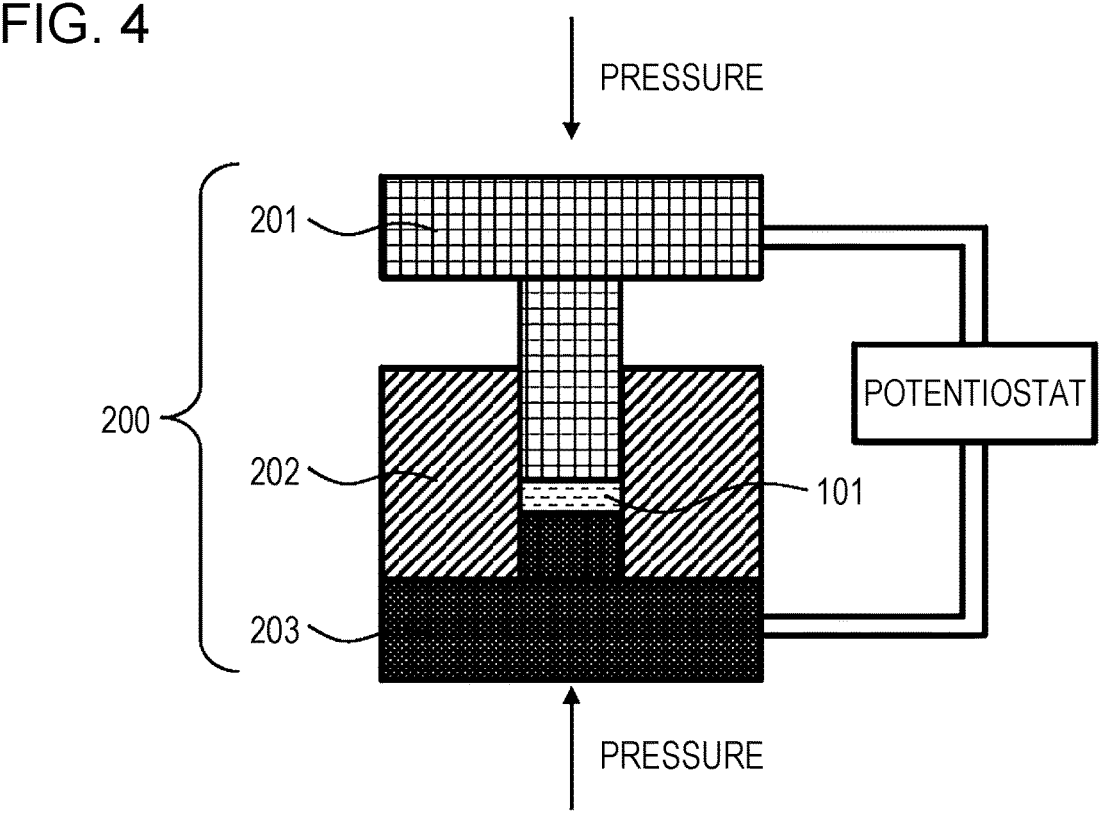
FIG. 4 is a schematic diagram of a pressure-molding die 200 used for evaluating the ionic conductivity of a solid electrolyte material.

FIG. 4 is a schematic diagram of a pressure-molding die 200 used for evaluating the ionic conductivity of a solid electrolyte material.

The pressure-molding die 200 included an upper punch 201, a die 202, and a lower punch 203. The die 202 was made of insulating polycarbonate. The upper punch 201 and the lower punch 203 were made of electronically conductive stainless steel.

Using the pressure-molding die 200 shown in FIG. 4, the impedance of the solid electrolyte material according to Sample 1 was measured by the method described below.

In a dry atmosphere with a dew point of lower than or equal to −60° C., the pressure-molding die 200 was filled with the solid electrolyte material according to Sample 1. Inside the pressure-molding die 200, a pressure of 300 MPa was applied to the solid electrolyte material according to Sample 1 (i.e., powder 101 of the solid electrolyte material in FIG. 4), using the upper punch 201 and the lower punch 203.

With the pressure being applied, the upper punch 201 and the lower punch 203 were connected to a potentiostat (Princeton Applied Research, VersaSTAT4) equipped with a frequency response analyzer. The upper punch 201 was connected to a working electrode and a potential measurement terminal, The lower punch 203 was connected to a counter electrode and a reference electrode. The impedance of the solid electrolyte material was measured by an electrochemical impedance measurement method at room temperature.

Figure 5:
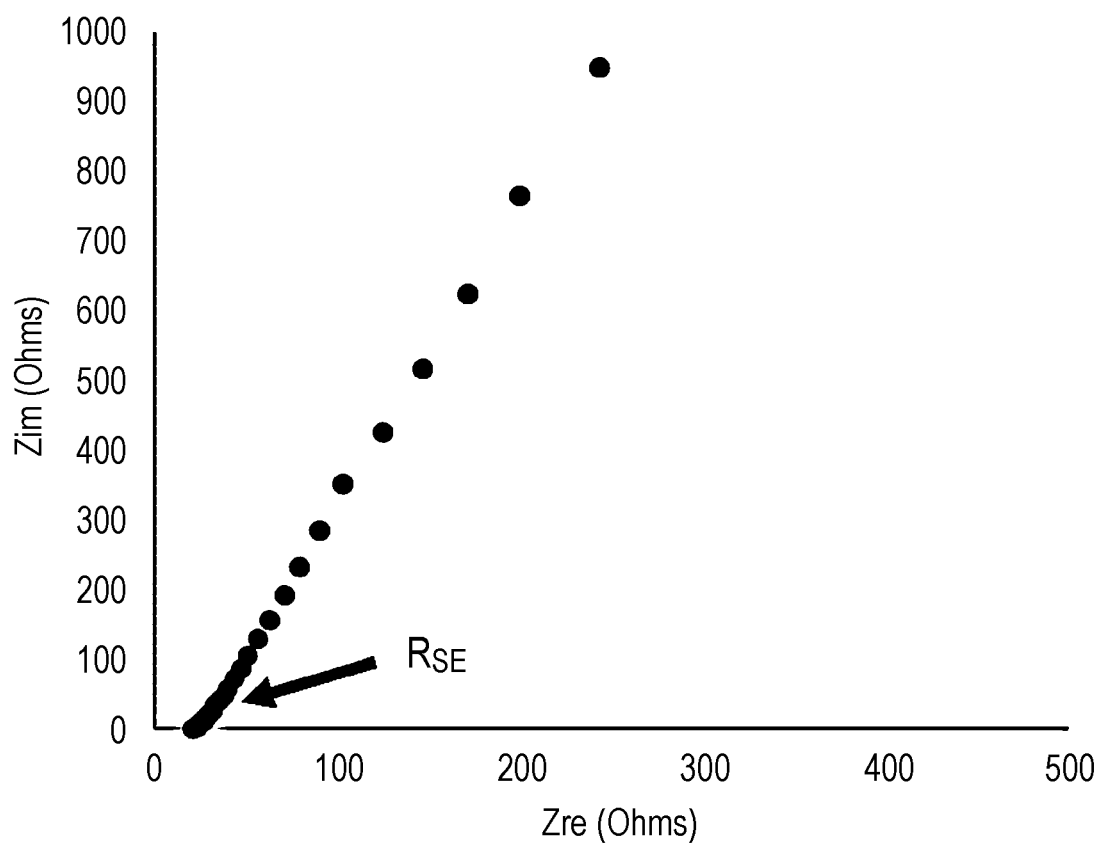
FIG. 5 is a graph showing the Cole-Cole plot obtained by impedance measurement of a solid electrolyte material according to Sample 1.

FIG. 5 is a graph showing the Cole-Cole plot obtained by impedance measurement of the solid electrolyte material according to Sample 1.

In FIG. 5, the real number value of the impedance at the measurement point having the smallest absolute value of the phase of the complex impedance was considered as a resistance value for the ionic conduction of the solid electrolyte material. Refer to the arrow $R_{SE}$ shown in FIG. 5 for the real number value. The ionic conductivity was calculated on the basis of the following formula (6) using the resistance value:

$$\sigma=(R_{SE} \times S/t)^{-1} \quad (6)$$

where σ represents the ionic conductivity. S represents the contact area between the solid electrolyte material and the upper punch 201 (equal to the area of a hollow portion of the die 202 in FIG. 4). $R_{SE}$ represents the resistance value of the solid electrolyte material. t represents the thickness of the solid electrolyte material (in FIG. 4, the thickness of the powder 101 of the solid electrolyte material).

The ionic conductivity of the solid electrolyte material according to Sample 1 measured at 25° C. was $3.1 \times 10^{-3}$ S/cm.

Samples 2 to 16 will be described below.
(Production of Solid Electrolyte Material)
<Samples 2 to 8>

Solid electrolyte materials according to Samples 2 to 8 were obtained as in Sample 1 except for the heat treatment temperature and the heat treatment time. The heat treatment temperature and the heat treatment time are shown in Table 1.

<Sample 9>

First, $(NH_4)_{0.5}SmCl_{3.5}$ serving as a starting material for a solid electrolyte material was synthesized.

As starting materials for $(NH_4)_{0.5}SmCl_{3.5}$, $Sm_2O_3$ and $NH_4Cl$ were prepared so as to satisfy the molar ratio of $Sm_2O_3$:$NH_4Cl=1:13.2$. That is, the preparation was made so that the amount of $NH_4Cl$ was 10 mol % in excess with respect to $Sm_2O_3$. These materials were pulverized in a mortar made of agate and mixed. The resulting mixture was placed in a crucible made of alumina, and heat-treated, in a nitrogen atmosphere, at 350° C. for 15 hours. Thus, $(NH_4)_{0.5}SmCl_{3.5}$ was obtained.

Next, in a dry argon atmosphere, $(NH_4)_3YCl_6$, $(NH_4)_{0.5}SmCl_{3.5}$, LiCl, LiBr, and $CaBr_2$ were prepared so as to satisfy the molar ratio of $(NH_4)_3YCl_6$:$(NH_{4.5}SmCl_{3.5}$:LiCl:LiBr:$CaBr_2$=0.8:0.2:0.5:2.3:0.1.

As in Sample 1 except for the items described above, a solid electrolyte material according to Sample 9 was obtained.

<Sample 10>

First, $SmCl_3$ serving as a starting material for a solid electrolyte material was synthesized.

As starting materials for $SmCl_3$, $Sm_2O_3$ and $NH_4Cl$ were prepared so as to satisfy the molar ratio of $Sm_2O_3:NH_4Cl=1:13.2$. That is, the preparation was made so that the amount of $NH_4Cl$ was 10 mol % in excess with respect to $Sm_2O_3$. These materials were pulverized in a mortar made of agate and mixed. The resulting mixture was placed in a crucible made of alumina, and heat-treated, in a nitrogen atmosphere, at 450° C. for 15 hours. Thus, $SmCl_3$ was obtained.

Next, in a dry argon atmosphere, $(NH_4)_3YCl_6$, $SmCl_3$, LiCl, LiBr, and $CaBr_2$ were prepared so as to satisfy the molar ratio of $(NH_4)_3YCl_6:SmCl_3:LiCl:LiBr:CaBr_2=0.8:0.2:0.5:2.3:0.1$.

As in Sample 1 except for the items described above, a solid electrolyte material according to Sample 10 was obtained.

<Sample 11>

First, $(NH_4)_{0.5}YCl_{3.5}$ serving as a starting material for a solid electrolyte material was synthesized.

As starting materials for $(NH_4)_{0.5}YCl_{3.5}$, $Y_2O_3$ and $NH_4Cl$ were prepared so as to satisfy the molar ratio of $Y_2O_3:NH_4Cl=1:13.2$. That is, the preparation was made so that the amount of $NH_4Cl$ was 10 mol % in excess with respect to $Y_2O_3$. These materials were pulverized in a mortar made of agate and mixed. The resulting mixture was placed in a crucible made of alumina, and heat-treated, in a nitrogen atmosphere, at 350° C. for 15 hours. Thus, $(NH_4)_{0.5}YCl_{3.5}$ was obtained.

Next, in a dry argon atmosphere, $(NH_4)_{0.5}YCl_{3.5}$, $(NH_4)_3SmCl_6$, LiCl, LiBr, and $CaBr_2$ were prepared so as to satisfy the molar ratio of
$(NH_4)_{0.5}YCl_{3.5}:(NH_4)_3SmCl_6:LiCl:LiBr:CaBr_2=0.8:0.2:0.5:2.3:0.1$.

As in Sample 1 except for the items described above, a solid electrolyte material according to Sample 11 was obtained.

<Sample 12>

First, $YCl_3$ serving as a starting material for a solid electrolyte material was synthesized.

As starting materials for $YCl_3$, $Y_2O_3$ and $NH_4Cl$ were prepared so as to satisfy the molar ratio of $Y_2O_3:NH_4Cl=1:13.2$. That is, the preparation was made so that the amount of $NH_4Cl$ was 10 mol % in excess with respect to $Y_2O_3$. These materials were pulverized in a mortar made of agate and mixed. The resulting mixture was placed in a crucible made of alumina, and heat-treated, in a nitrogen atmosphere, at 450° C. for 15 hours. Thus, $YCl_3$ was obtained.

Next, in a dry argon atmosphere, $YCl_3$, $(NH_4)_3SmCl_6$, LiCl, LiBr, and $CaBr_2$ were prepared so as to satisfy the molar ratio of $YCl_3:(NH_4)_3SmCl_6:LiCl:LiBr:CaBr_2=0.8:0.2:0.5:2.3:0.1$.

As in Sample 1 except for the items described above, a solid electrolyte material according to Sample 12 was obtained.

<Sample 13>

In a dry argon atmosphere, $(NH_4)_3YCl_6$, $(NH_4)_3SmCl_6$, LiCl, LiBr, and $CaCl_2$ were prepared so as to satisfy the molar ratio of
$(NH_4)_3YCl_6:(NH_4)_3SmCl_6:LiCl:LiBr:CaCl_2=0.8:0.2:0.3:2.5:0.1$.

As in Sample 1 except for the items described above, a solid electrolyte material according to Sample 13 was obtained.

<Sample 14>

First, $(NH_4)_3YBr_6$ serving as a starting material for a solid electrolyte material was synthesized.

As starting materials for $(NH_4)_3YBr_6$, $Y_2O_3$ and $NH_4Br$ were prepared so as to satisfy the molar ratio of $Y_2O_3:NH_4Br=1:13.2$. That is, the preparation was made so that the amount of $NH_4Br$ was 10 mol % in excess with respect to $Y_2O_3$. These materials were pulverized in a mortar made of agate and mixed. The resulting mixture was placed in a crucible made of alumina, and heat-treated, in a nitrogen atmosphere, at 200° C. for 15 hours. Thus, $(NH_4)_3YBr_6$ was obtained.

Next, in a dry argon atmosphere, $(NH_4)_3YBr_6$, $(NH_4)_3SmCl_6$, LiCl, LiBr, and $CaCl_2$ were prepared so as to satisfy the molar ratio of
$(NH_4)_3YBr_6:(NH_4)_3SmCl_6:LiCl:LiBr:CaCl_2=0.8:0.2:2.7:0.1:0.1$.

As in Sample 1 except for the items described above, a solid electrolyte material according to Sample 14 was obtained.

<Sample 15>

First, $(NH_4)_3SmBr_6$ serving as a starting material for a solid electrolyte material was synthesized.

As starting materials for $(NH_4)_3SmBr_6$, $Sm_2O_3$ and $NH_4Br$ were prepared so as to satisfy the molar ratio of $Sm_2O_3:NH_4Br=1:13.2$. That is, the preparation was made so that the amount of $NH_4Br$ was 10 mol % in excess with respect to $Sm_2O_3$. These materials were pulverized in a mortar made of agate and mixed. The resulting mixture was placed in a crucible made of alumina, and heat-treated, in a nitrogen atmosphere, at 200° C. for 15 hours. Thus, $(NH_4)_3SmBr_6$ was obtained.

Next, in a dry argon atmosphere, $(NH_4)_3YCl_6$, $(NH_4)_3SmBr_6$, LiCl, LiBr, and $CaCl_2$ were prepared so as to satisfy the molar ratio of
$(NH_4)_3YCl_6:(NH_4)_3SmBr_6:LiCl:LiBr:CaCl_2=0.8:0.2:0.9:1.9:0.1$.

As in Sample 1 except for the items described above, a solid electrolyte material according to Sample 15 was obtained.

<Sample 16>

As in Sample 1 except for the heat treatment temperature, a solid electrolyte material according to Sample 16 was obtained.

(Evaluation of Ionic Conductivity)

Ionic conductivities of the solid electrolyte materials according to Samples 2 to 16 were measured as in Sample 1. The measurement results are shown in Table 1.

In Table 1, the starting material 1 is a halide containing Y. The starting material 2 is a halide containing Sm. The starting material 3 is LiCl. The starting material 4 is LiBr. The starting material 5 is a halide containing Ca.

TABLE 1

|  | Starting material 1 $(NH_4)_aY\alpha_{a+3}$ | | Starting material 2 $(NH_4)_bSm\beta_{b+3}$ | | Starting material 5 $Ca\delta_2$ | Mixing molar ratio Starting material 1: Starting material 2:Starting material 3:Starting material 4:Starting material 5 | Heat treatment temperature (°C.) | Heat treatment time (hr) | Ionic conductivity (S/cm) |
|---|---|---|---|---|---|---|---|---|---|
|  | α | a | β | b | δ | | | | |
| Sample 1 | Cl | 3 | Cl | 3 | Br | 0.8:0.2:0.5:2.3:0.1 | 500 | 1 | $3.1 \times 10^{-3}$ |
| Sample 2 | Cl | 3 | Cl | 3 | Br | 0.8:0.2:0.5:2.3:0.1 | 300 | 5 | $6.7 \times 10^{-7}$ |
| Sample 3 | Cl | 3 | Cl | 3 | Br | 0.8:0.2:0.5:2.3:0.1 | 350 | 1 | $6.7 \times 10^{-4}$ |
| Sample 4 | Cl | 3 | Cl | 3 | Br | 0.8:0.2:0.5:2.3:0.1 | 400 | 1 | $8.9 \times 10^{-4}$ |
| Sample 5 | Cl | 3 | Cl | 3 | Br | 0.8:0.2:0.5:2.3:0.1 | 450 | 1 | $1.4 \times 10^{-3}$ |
| Sample 6 | Cl | 3 | Cl | 3 | Br | 0.8:0.2:0.5:2.3:0.1 | 550 | 1 | $3.1 \times 10^{-3}$ |
| Sample 7 | Cl | 3 | Cl | 3 | Br | 0.8:0.2:0.5:2.3:0.1 | 600 | 1 | $2.5 \times 10^{-3}$ |
| Sample 8 | Cl | 3 | Cl | 3 | Br | 0.8:0.2:0.5:2.3:0.1 | 650 | 1 | $1.1 \times 10^{-3}$ |
| Sample 9 | Cl | 3 | Cl | 0.5 | Br | 0.8:0.2:0.5:2.3:0.1 | 500 | 1 | $3.6 \times 10^{-3}$ |
| Sample 10 | Cl | 3 | Cl | 0 | Br | 0.8:0.2:0.5:2.3:0.1 | 500 | 1 | $3.9 \times 10^{-3}$ |
| Sample 11 | Cl | 0.5 | Cl | 3 | Br | 0.8:0.2:0.5:2.3:0.1 | 500 | 1 | $3.1 \times 10^{-3}$ |
| Sample 12 | Cl | 0 | Cl | 3 | Br | 0.8:0.2:0.5:2.3:0.1 | 500 | 1 | $1.9 \times 10^{-3}$ |
| Sample 13 | Cl | 3 | Cl | 3 | Cl | 0.8:0.2:0.3:2.5:0.1 | 500 | 1 | $3.5 \times 10^{-3}$ |
| Sample 14 | Br | 3 | Cl | 3 | Cl | 0.8:0.2:2.7:0.1:0.1 | 500 | 1 | $2.4 \times 10^{-3}$ |
| Sample 15 | Cl | 3 | Br | 3 | Cl | 0.8:0.2:0.9:1.9:0.1 | 500 | 1 | $2.8 \times 10^{-3}$ |
| Sample 16 | Cl | 3 | Cl | 3 | Br | 0.8:0.2:0.5:2.3:0.1 | 200 | 1 | $3.1 \times 10^{-10}$ |

CONSIDERATIONS

As is clear from Samples 1 to 16, the solid electrolyte materials produced by the production method of the present disclosure have, at around room temperature, an ionic conductivity of greater than or equal to $3.1 \times 10^{-10}$ S/cm. As is clear from Samples 1 to 15, when the heat treatment temperature is higher than or equal to 300° C. and lower than or equal to 650° C., the resulting solid electrolyte material has, at around room temperature, a high ionic conductivity of greater than or equal to $6.7 \times 10^{-7}$ S/cm. The reason for this is considered to be that, when the heat treatment temperature is 300° C., a solid phase reaction proceeds sufficiently.

As is clear from comparison of Samples 1 and 3 to 8 with Sample 2, when the heat treatment temperature is higher than or equal to 350 and lower than or equal to 650° C., the ionic conductivity of the solid electrolyte material is further enhanced.

As is clear from comparison of Samples 1 and 5 to 8 with Samples 3 and 4, when the heat treatment temperature is higher than or equal to 450 and lower than or equal to 650° C., the ionic conductivity of the solid electrolyte material is still further enhanced.

As is clear from comparison of Samples 1, 6, and 7 with Samples 5 and 8, when the heat treatment temperature is higher than or equal to 500° C. and lower than or equal to 600° C., the ionic conductivity of the solid electrolyte material is still further enhanced. The reason for this is considered to be that the solid electrolyte material has higher crystallinity.

As described above, the halide produced by the production method of the present disclosure has high lithium ion conductivity. Furthermore, the production method of the present disclosure is a simple and easy method and a method with industrially high productivity. The method with industrially high productivity is, for example, a method enabling low-cost mass production.

The production method of the present disclosure is, for example, used as a method for producing a solid electrolyte material. The solid electrolyte material produced by the production method of the present disclosure is used, for example, in all-solid-state lithium-ion secondary batteries.

What is claimed is:

1. A production method for producing a halide, the method comprising heat-treating a mixed material containing $(NH_4)_aY\alpha_{3+a}$, $(NH_4)_bSm\beta_{3+b}$, Liγ, and $Ca\delta_2$ in an inert gas atmosphere,
   wherein α, β, γ, and δ are each independently at least one selected from the group consisting of F, Cl, Br, and I, and
   the following three formulas:

$0 \leq a \leq 3$, $0 \leq b \leq 3$, and $0 < a+b \leq 6$, are satisfied.

2. The production method according to claim 1, wherein the mixed material is heat-treated at higher than or equal to 300° C.

3. The production method according to claim 2, wherein the mixed material is heat-treated at higher than or equal to 350° C.

4. The production method according to claim 3, wherein the mixed material is heat-treated at higher than or equal to 450° C.

5. The production method according to claim 1, wherein the mixed material is heat-treated at lower than or equal to 650° C.

6. The production method according to claim 1, wherein the mixed material is heat-treated for more than or equal to 1 hour and less than or equal to 72 hours.

7. The production method according to claim 1, wherein the following two formulas:

$0.5 \leq a \leq 3$, and $0.5 \leq b \leq 3$, are satisfied.

8. The production method according to claim 7, wherein the following two formulas:

$a = 3$, and $b = 3$, are satisfied.

9. The production method according to claim 1, wherein $\alpha$, $\beta$, $\gamma$, and $\delta$ are each independently at least one selected from the group consisting of Cl and Br.

10. The production method according to claim 1, further comprising preparing the mixed material,
 wherein in the preparation of the mixed material, $(NH_4)_a Y\alpha_{3+a}$ is synthesized from $Y_2O_3$ and $NH_4\alpha$, and $(NH_4)_b Sm\beta_{3+b}$ is synthesized from $Sm_2O_3$ and $NH_4\beta$.

* * * * *